United States Patent [19]

Hirai et al.

[11] 4,412,022

[45] Oct. 25, 1983

[54] POLYURETHANE COATING COMPOSITIONS PREPARED FROM A POLYMERIC DIOL, AN ALICYCLIC DIISOCYANATE, AN ALICYCLIC DIAMINE AND EITHER HYDRAZINE OR ISOPHTHALIC ACID DIHYDRAZIDE

[75] Inventors: Koji Hirai; Kenji Shirano, both of Kurashiki; Takayuki Okamura, Okayama, all of Japan

[73] Assignee: Kuraray Co., Ltd., Kurashiki, Japan

[21] Appl. No.: 374,923

[22] Filed: May 5, 1982

[30] Foreign Application Priority Data

May 19, 1981 [JP] Japan ................................ 56-76199
Jul. 21, 1981 [JP] Japan .............................. 56-114799
Oct. 13, 1981 [JP] Japan .............................. 56-163964

[51] Int. Cl.³ ........................................... C08L 75/08
[52] U.S. Cl. .................................... 524/104; 524/173; 524/234; 524/317; 524/376; 524/591; 524/726; 524/744; 524/761; 524/769; 524/839

[58] Field of Search ............... 524/104, 173, 234, 317, 524/376, 591, 726, 744, 761, 769, 839

[56] References Cited

U.S. PATENT DOCUMENTS 3,900,688  8/1975  Thoma et al. ........................ 428/246
4,212,916  7/1980  Tanaka et al. ................... 428/423.7

Primary Examiner—Maurice J. Welsh
Attorney, Agent, or Firm—Oblon, Fisher, Spivak, McClelland & Maier

[57] ABSTRACT

Polyurethane compositions comprising a polyurethane synthesized by reacting a diol, a specific alicyclic diisocyanate, a specific alicyclic diamine and hydrazine or isophthalic acid dihydrazide in specific proportions and a solvent therefor have good solution stability and, when applied as coating compositions, give coats with good light stability, good surface properties, high softening points and sufficient flexibility at low temperatures.

7 Claims, No Drawings

POLYURETHANE COATING COMPOSITIONS PREPARED FROM A POLYMERIC DIOL, AN ALICYCLIC DIISOCYANATE, AN ALICYCLIC DIAMINE AND EITHER HYDRAZINE OR ISOPHTHALIC ACID DIHYDRAZIDE

BACKGROUND OF THE INVENTION

1. Field of the Invention

This invention relates to polyurethane compositions suited for use as coating compositions. More particularly, the invention relates to polyurethane compositions comprising a polyurethane synthesized by the reaction of a polymeric diol, a specific alicyclic organic diisocyanate, a specific alicyclic diamine and hydrazine or isophthalic acid dihydrazide in specific proportions and a solvent for said polyurethanes. These polyurethane compositions have good solution stability and, when applied as coating compositions, give coats with good light stability, good surface properties, high softening points and sufficient flexibility at low temperatures.

2. Description of the Prior Art

Because of their excellent properties with respect to resistance to damage by chemicals, abrasion resistance, toughness, cold resistance and durability, and also as a result of developments and advances of various processing techniques for them and furthermore because of their unique elasticity nature, which covers a middle region between rubbers and plastics, polyurethanes are suitable for a wide variety of uses, for example, in the production of various shaped articles, especially foamed articles such as cushion material and construction materials, elastic fibers, paints, adhesives and furthermore synthetic leather-like materials. While they have many advantages such as mentioned above, polyurethanes are poor in light stability. Specifically, they are liable to decomposition upon exposure to light, which decomposition leads to decrease in strength and elongation characteristics. Especially when polyurethanes are used in coating compositions, it is very important that they have good light resistance.

So far various methods have been proposed for the improvement of light stability, which is the most important problem to be solved for wider use of polyurethanes. Polyurethanes are generally produced by reacting a high molecular diol of the polyester or polyether or polycarbonate type, for instance, with an organic diisocyanate and an active hydrogen-containing compound, which is a chain extender. It is known that, when an aromatic organic diisocyanate is used as the organic diisocyanate or when an aromatic organic diamine is used as the active hydrogen-containing compound, the resulting polyurethanes are susceptible to degradation under the action of light. The light resistance can be improved by the use of an aliphatic or alicyclic organic diisocyanate and/or diamine in place of the aromatic organic diisocyanate and/or diamine. It is also known that polyurethanes produced with the use of hydrazine as the chain extender generally have improved light resistance.

Based on these findings, German Patent No. 2,252,280 (which corresponds to U.S. Pat. No. 3,900,688 and British Pat. No. 1,418,550) discloses that polyurethanes synthesized by using a polycarbonate glycol as the polymeric diol, a combination of an aliphatic organic diisocyanate and an alicyclic organic diisocyanate, specifically a combination of hexamethylene diisocyanate and 1-isocyanato-3,3,5-trimethyl-5-isocyanatomethylcyclohexane, as the organic diisocyanate and a combination of an alicyclic organic diamine, specifically 4,4'-diamino-dicyclohexylmethane, and hydrazine as the chain extender have excellent light resistance. The polyurethanes disclosed in the patent specification cited above, though considerably improved in light resistance, have low softening points and poor abrasion resistance and consequently are not suited for use in coating compositions.

On the other hand, U.S. Pat. No. 4,212,916 (which corresponds to British Pat. No. 2,014,593 and German Patent No. 2,905,185) discloses that polyurethanes produced by using dicyclohexylmethane-4,4'-diisocyanate, which is an alicyclic organic diisocyanate, as the organic diisocyanate and a combination of 4,4'-diaminodicyclohexylmethane, which is an alicycic organic diamine, and phthalic acid dihydrazide as the chain extender, when dissolved in an aprotic organic solvent such as dimethylformamide, give compositions having good light resistance. However, the polyurethanes described in the above-cited patent are very poor in solution stability. Specifically, the polymer solutions unfavorably increase in viscosity during polymerization or storage after polymerization and sometimes gelation takes place. Thus, the known polyurethanes are poor in solution stability, softening point, abrasion resistance and other respects and cannot give satisfactory coating compositions although they are satisfactory with respect to light resistance or light stability.

SUMMARY OF THE INVENTION

An object of this invention is to provide polyurethane compositions which, when used as coating compositions, are capable of forming coat films having good light stability. Another object of the invention is to provide polyurethane compositions having good solution stability. A further object of the invention is to provide polyurethane compositions which realize the above objects and furthermore, when used as coating compositions, give coats having good abrasion resistance, high softening points and flexibility at low temperatures (namely cold resistance).

These objects are accomplished when the polyurethane compositions comprise a polyurethane synthesized substantially from (a) a polymeric diol having an average molecular weight within the range of 1,200 to 2,500, (b) an alicyclic organic diisocyanate, (c) an alicyclic organic diamine and (d) hydrazine or isophthalic acid dihydrazide and a mixed solvent capable of dissolving said polyurethane, said polyurethane satisfying the following conditions (i) through (iv), namely (i) that component (b) comprises at least 20 mole percent thereof of an alicyclic organic diisocyanate having the formula

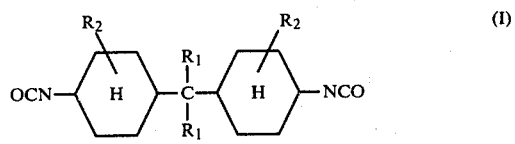

wherein $R_1$ and $R_2$ each is a hydrogen atom or a lower alkyl group, (ii) that the molar ratio of component (b) to component (a) is within the range of 2.5 to 5.0, (iii) that at least one of components (b) and (c) comprises as a component thereof a compound having the formula

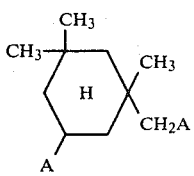 (II)

wherein A is an amino or isocyanato group and that the total content of the compound or compounds of the above formula (II) based on the sum total of components (b), (c) and (d) is 15 to 45 mole percent, and (iv) that, when component (d) is hydrazine, component (c) comprises at least 20 mole percent thereof of an alicyclic organic diamine having the formula

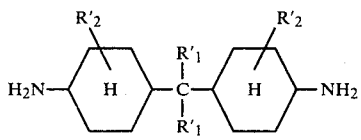 (III)

wherein $R_1'$ and $R_2'$ each is a hydrogen atom or a lower alkyl group and that the molar ratio of component (d) to the sum total of components (c) and (d) is within the range of 0.05 to 0.5, or that, when component (d) is isophthalic acid dihydrazide, the molar ratio of component (d) to the sum total of components (c) and (d) is within the range of 0.1 to 0.7, and said mixed solvent satisfying the condition (v) that it comprises 3 to 70 percent by weight thereof of a compound of the general formula

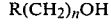 (IV)

wherein R is a hydrogen atom or a methoxy, ethoxy or acetoxy group and, when R is a hydrogen atom, n is an integer of 0 through 4 and when R is a methoxy, ethoxy or acetoxy group, n is 2, and that, when component (d) is isophthalic acid dihydrazide, said mixed solvent comprises 40 to 97 percent by weight thereof of an aprotic polar compound.

DETAILED DESCRIPTION OF THE INVENTION

The polymeric diol to be used in synthesizing the polyurethanes which constitute the polyurethane compositions of the present invention includes such common polymeric diols as polyether glycols (e.g. polytetramethylene ether glycol, polypropylene ether glycol), polyester glycols (e.g. polyethylene adipate glycol, polypropylene adipate glycol, polytetramethylene adipate glycol, polyhexamethylene adipate glycol, polyethylene-propylene adipate glycol, polycaprolactone glycol), polycarbonate glycols (e.g. 1,6-hexanediol polycarbonate glycol), polyacetal glycol and polybutadiene glycol.

It is important that the average molecular weight of the diol is within the range of 1,200 to 2,500. While polymeric diols having an average molecular weight of about 1,000 are generally used in the production of polyurethanes, it is essential for the production of polyurethane elastomers having good light resistance and good cold resistance and moreover high softening points that the polymeric diol has an average molecular weight of not less than 1,200 and that the molar ratio of the diisocyanate compound to the polymeric diol is adequately great. With polymeric diols having an average molecular weight of less than 1,200, the cold resistance and heat resistance become insufficient; the product polyurethanes are poor in flexibility at low temperatures and have high glass transition points and low softeing points. When the diol has an average molecular weight of more than 2,500, considerable extension of the hard segment block chain becomes necessary for the simultaneous improvement in cold resistance and heat resistance. However, such extension results in decrease in the stability of the polymer solution and furthermore unfavorably affects the mechanical properties (e.g. tensile strength, elongation) of the polyurethanes.

Especially when polyurethanes having good dyeability and color fastness are desired, it is preferable to use a polymeric diol containing ethylene oxide structural units, namely —$(CH_2CH_2O)_m$—, or a diol mixture composed of an ethylene oxide structural unit-containing diol and an ethylene oxide structural unit-free diol, with the content of the ethylene oxide structural units in said high molecular diol being within the range of 5 to 50 percent by weight. As the ethylene oxide structural units in said polymeric diol mentioned, for example, polyethylene ether glycol, poly(oxypropylene)poly(oxyethylene)glycol and poly(oxyethylene)polycarprolactone block copolymer. When an ethylene oxide structural unit-containing diol alone is used, the number of repeating ethylene oxide structural units, namely the polyoxyethylene chain length, becomes an important factor and the average number of said repeating units, namely m in the above formula, is preferably within the range of 12 to 60 from the viewpoints of dyeability and flexibility. When a mixed diol composed of an ethylene oxide structural unit-containing diol and an ethylene oxide structural unit-free diol is used as the polymeric diol, prefered examples of the ethylene oxide structural unit-free diol are the above-mentioned polyester glycols and polycarbonate glycols.

The term "polycarbonate glycols" are used herein generically to include polymeric diols containing the group represented by —(R—O—C(=O)—O)$_p$— and having hydroxyl groups at the both ends. The most preferred among them in practicing the invention is the one in which R is a hexamethylene group, namely 1,6-hexanediol polycarbonate. In the above formula, R is a bivalent organic residue and p is the degree of polymerization.

In accordance with the present invention, an alicyclic organic diisocyanate is used as the diisocyanate compound. Typical examples of the alicyclic organic diisocyanate are 1,3-cyclohexanediisocyanate, 1,4-cyclohexanediisocyanate, 1,3-bis(isocyanatomethyl)cyclohexane, methylcyclohexanediisocyanate, 3-isocyanatomethyl-3,5,5-trimethylcyclohexyl isocyanate (commonly called "isophorone diisocyanate"), dicyclohexylmethane-4,4'-diisocyanate, 3,3'-dimethyl-dicyclohexylmethane-4,4'-diisocyanate and 4,4'-isopropylidnedicyclohexyl diisocyanate.

The use of an aliphatic or aromatic orgnaic diisocyanate in place of the alicyclic organic diisocyanate will give polyurethanes which are inferior in light stability, mechanical properties, heat resistance and water resistance. Especially when an aromatic organic diisocyanate is used, the product polyurethanes have very poor light stability.

According to the present invention, the diisocyanate compound must be an alicyclic organic diisocyanate, but it is not always necessary that the whole amount thereof is an alicyclic organic diisocyanate. A small portion thereof may be replaced with an aliphatic or aromatic organic diisocyanate. However, with the increase in the content of the aliphatic or aromatic organic diisocyanate, the above-mentioned drawbacks becomes apparent. Therefore, in the practice of the present invention, it is preferable to use no organic diisocyanates other than alicyclic organic diisocyanates, particularly no aromatic organic diisocyanates at all.

In accordance with this invention, the alicyclic organic diisocyanate must comprise at least 20 mole percent thereof of an alicyclic organic diisocyanate having the formula

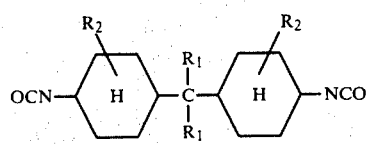

(I)

wherein $R_1$ and $R_2$ each is a hydrogen atom or a lower alkyl group. Typical examples of the diisocyanate compound of the above formula (I) are dicyclohexylmethane-4,4'-diisocyanate, 3,3'-dimethyl-dicyclohexylmethane-4,4'-diisocyanate, 4,4'-isopropylidenedicyclohexyl diisocyanate and 3,3'-dimethyl-4,4'-isopropylidenedicyclohexyl diisocyanate. Preferable is dicyclohexylmethane-4,4'-diisocyanate. When the amount of the alicyclic organic diisocyanate represented by formula (I) is less than 20 mole percent, the product polyurethanes have low softening points and poor abrasion resistance and therefore are not suited for use in coating compositions.

In accordance with the present invention, the molar ratio of the alicyclic organic diisocyanate to the polymeric diol must be within the range of 2.5 to 5.0. Generally in the synthesis of polyurethanes, the molar ratio of organic diisocyanate to the polymeric diol is generally lower than 2.5 in many cases. It is one of the features of the present invention that the molar ratio in question os considerably higher than that generally employed in the prior art. When the molar ratio of organic diisocyanate to the polymeric diol is less than 2.5, the polyurethane compositions produced otherwise in accordance with the present invention will have poor light stability and insufficient heat resistance. Conversely, if said ratio is greater than 5.0, the product polyurethane compositions will give inflexible films with decreased elongation.

In accordance with this invention, the chain extender must be a combination of an alicyclic organic diamine and hydrazine or a combination of an alicyclic organic diamine and isophthalic acid dihydrazide. Representative examples of the alicyclic organic diamine usable in accordance with the invention are 1,3-diaminocyclohexane, 1,4-diaminocyclohexane, di(aminomethyl)cyclohexane, 1-amino-3-aminomethyl-3,5,5-trimethylcyclohexane (commonly called "isophoronediamine"), 4,4'-diaminodicyclohexylmethane, 4,4'-diamino-3,3'-dimethyldicyclohexylmethane and cyclohexylenediamine.

If an aliphatic or aromatic organic diamine is used in place of the alicyclic organic diamine, the product polyurethanes will be inferior in mechanical properties, heat resistance, water resistance and light stability. In particular, the use of an aromatic one will result in very poor light resistance. Therefore, it is preferable in practicing the present invention to use no other active hydrogen-containing organic compounds than alicyclic organic diamine, hydrazine and isophthalic acid dihydrazide, particularly no aromatic organic diamines at all. The term "active hydrogen-containing organic compounds" is used herein to include low molecular compounds having two hydroxyl or amino groups and commonly used as the polyurethane chain extenders.

Furthermore, in accordance with the invention, at least one of the alicyclic organic diisocyanate and the alicyclic organic diamine must comprise as a component thereof a compound represented by the formula

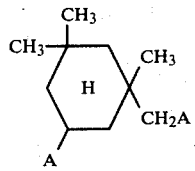

(II)

wherein A is an amino or isocyanato group, namely isophorone diisocyanate or isophorone-diamine. The amount of said compound must be within the range of 15 to 45 mole percent based on the sum total of the alicyclic organic diisocyanate, the alicyclic organic diamine and hydrazine or isophthalic acid dihydrazide. When the amount is less than 15 mole percent, the product polyurethanes have poor solution stability in solvents and undergo viscosity increase or gelation in a short period of time. Furthermore, viscosity increase or gelation may take place already during polymerization and render it difficult even to obtain polyurethane solutions. If the amount exceeds 45 mole percent, the product polyurethane compositions, when used as coating compositions, give coats with poor abrasion resistance and low softening points which render them inadequate as coating compositions.

Moreover, in accordance with the present invention, the alicyclic organic diamine, when used in combination with hydrazine as the chain extender, must comprise at least 20 mole percent thereof of an alicyclic organic diamine represented by the formula

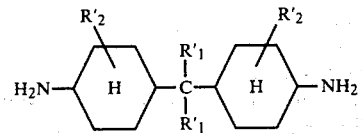

(III)

wherein $R_1'$ and $R_2'$ each is a hydrogen atom or a lower alkyl group. Representative examples of the diamine compound of the above formula are 4,4'-diamino-dicyclohexylmethane, 4,4'-isopropylidenedicyclohexyldiamine, 3,3'-dimethyl-4,4'-diamino-dicyclohexylmethane and 3,3'-dimethyl-4,4'-isopropylidenedicyclohexyldiamine. Preferred is 4,4'-diaminodicyclohexylmethane. When the amount of the alicyclic organic diamine of the above formula (III) is less than 20 mole percent, the product polyurethanes have low softening points and poor abrasion resistance which render the polyurethane compositions unsuited for use as coating compositions.

According to the invention, when hydrazine used in combination with the alicyclic organic diamine as the chain extender, the molar ratio of hydrazine to the total amount of the alicyclic organic diamine and hydrazine must be in the range of 0.05:1 to 0.5:1, preferably within the range of 0.1:1 to 0.35:1. The hydrazine may be used in the form of a hydrate. When a combination of the alicyclic organic diamine and isophthalic acid dihydrazide is used as the chain extender, the molar ratio of isophthalic acid dihydrazide to the total amount of alicyclic organic diamine and isophthalic acid dihydrazide must be in the range of 0.1:1 to 0.7:1, preferably 0.3:1 to 0.6:1. When the amount of hydrazine or isophthalic acid dihydrazide exceeds the upper limit of the respective range, the product polymers have low softening points, poor solution stability, unsatisfactory heat resistance and resistance to hydrolysis and other disadvantages. If, conversely, the amount does not reach the relevant range, the resistance to light degradation decreases to a great extent and at the same time the resistance against oxidative degradation and the tensile strength and elongation, among others, are also decreased; the polyurethane compositions are no more suited for use as coating compositions.

A further important factor in the practice of the present invention is the solvent which constitutes the polyurethane compositions of the invention. Basically, in the first place, the solvent must be capable of dissolving the above-mentioned polyurethanes. Thus, for example, aprotic polar solvents such as dimethylformamide, diethylformamide, dimethylacetamide, dimethylsulfoxide, N-methylpyrrolidone, N,N,N',N'-tetramethylurea, hexamethylphosphoramide and tetramethylene sulfone, aromatic hydrocarbons such as benzene, toluene, xylene and ethylbenzene, solvent esters such as methyl acetate, ethyl acetate and butyl acetate, solvent ketones such as acetone, methyl ethyl ketone, methyl isobutyl ketone and cyclohexanone, chlorinated hydrocarbon solvents such as 1,1,2-trichloroethane and dichloroethane, solvent alcohols such as isopropanol and solvent ethers such as tetrahydrofuran and dibutyl ether, among others, may be used. However, the use of these solvents alone or in combination may lead to unstable polymer solutions or cause viscosity increase or gelation in a short period of time. For preventing such phenomena, it is essential in accordance with the invention to use one or more compounds selected from among the compounds represented by the general formula

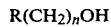     (IV)

wherein R is a hydrogen atom or a methoxy, ethoxy or acetocy group and, when R is a hydrogen atom, n is 0, 1, 2, 3 or 4 and when R is a methoxy, ethoxy or acetoxy group, n is 2. The amount of such solvent is within the range of 3 to 70 percent by weight, preferably 5 to 60 percent by weight, based on the whole solvent system used.

When the compound of the above general formula (IV) is absent or, if present, present in an amount of less than 3 percent by weight, the stability of the polymer solutions is unsatisfactory, while a solvent system containing said compound in an amount exceeding 70 percent by weight gives poor solution stability at low temperatures and leads to turbidity or viscosity increase and eventually to gelation. In extreme cases, turbidity or paste-like state is produced already during polymerization. As the compound of the above general formula, there may be mentioned water, methanol, ethanol, n-propanol, n-butanol, methyl cellosolve, ethyl cellosolve and ethyleneglycol monoacetate.

When a combination of the alicyclic organic diamine and isophthalic acid dihydrazide is used as the chain extender, 40 to 97 percent by weight of the solvent must be composed of at least one aprotic polar solvent selected from the group consisting of the above-mentioned aprotic polar solvents, preferably dimethylformamide, dimethylacetamide, dimethyl sulfoxide or N-methylpyrrolidone. When the amount of the aprotic polar solvent is less than 40 percent by weight, gelation tends to take place.

The polyurethane compositions of the present invention comprise a polyurethane synthesized substantially from the above-mentioned polymeric diol, alicyclic diisocyanate, alicyclic diamine and hydrazine or isophthalic acid dihydrazide and the above-mentioned mixed solvent. For their use as coating compositions, the compositions preferably contain the polyurethane in an amount within the range of 3 to 40 percent by weight, more preferably within the range of 5 to 25 percent by weight.

The polyurethanes of the invention can be synthesized by known methods so far generally used in synthesizing various polyurethanes. The following is typical of such methods.

First, the polymeric diol and the alicyclic organic diisocyanate are reacted with stirring and heating at 50°–130° C. under a nitrogen atmosphere in such proportions that the isocyanato groups are in stoichiometric excess of the terminal hydroxyl groups of the polymeric diol. The terminal isocyanato group-containing polyurethane prepolymer thus obtained is then dissolved in an aprotic polar solvent or such a solvent as toluene, tetrahydrofuran, isopropanol or methyl ethyl ketone and subjected to the chain extension reaction with the alicyclic organic diamine and hydrazine or isophthalic acid dihydrazide at a temperature in the vicinity of room temperature. To the thus-obtained polyurethane solution, there is added a compound of the general formula (IV) to give a composition in accordance with the invention.

In addition to the above method, various methods are available for the production of the polyurethane compositions according to the invention. The method given above by way of example is by no means limitative of the present invention.

For further increasing the dyeability of the polyurethanes, a tertiary nitrogen atom-containing compound, for example, N-methylaminobispropylamine, N-methyldiethanolamine, N-isobutyldiethanolamine or 1,4-bis-(aminopropyl)piperidine, may be used as a part of the chain extender. However, with the increase in content of such tertiary nitrogen-containing compound, other required characteristics than dyeability show tendency to decrease. Therefore, the content of such tertiary nitrogen-containing compound should preferably be not more than 15 mole percent based on the whole amount of chain extender.

The polyurethane compositions of the invention may contain antioxidants, ultraviolet absorbers, pigments, dyes, fire retardants and other additives and fillers.

The polyurethane compositions of the invention are especially suited for application as coating compositions to cloths and synthetic leather-like sheet materials. They are also good coating compositions to be applied to the surface of plastics, rubber and glass articles.

The following examples illustrate the invention more detailedly. In the examples, for the evaluation of the adhessiveness to a hot roll, a synthetic leather-like sheet material substrate was coated with the polyurethane composition obtained in each example by means of a gravure printing roll so as to give a 10-microns thick coat after drying. The coat surface was embossed with an embossing roll at 170° C. and examined for adhesion of the coat layer to the surface of said embossing roll. If the coat layer adheres to the embossing roll surface, the leather-like sheet material undergoes remarkable surface damages and the commercial value thereof is completely lost. Generally, polyurethane resins having higher softening points are more suited for use in coating compositions since they are less adhesive to the embossing roll surface, hence the embossing operation can be performed in a stable manner. The adhesiveness thus correlates with the softening point of the polyurethane resin. In the examples, the symbol X means that adhesion to the embossing roll took place and the symbol O means that the embossing operation could be performed stably.

The solution stability was evaluated with respect to appearance of the polyurethane resin solution (transparent or turbid), storage stability (viscosity increase, etc.) and occurrence or nonoccurence of gelation. The symbol O means that the solution was clear and transparent and did not reveal any changes during storage (for at least 6 months), X means that white turbidity and/or threading and/or viscosity increase during storage was observed, and XX means that the flowability was entirely lost in a short period of time due to conversion into a pasty state, gelation, etc. The light stability was evaluated in terms of present tensile strength retention after exposure to ultraviolet light in an atmosphere maintained at 63° C. for 500 hours in a Fade-Ometer, the thermal stability in terms of percent tensile strength retention after heating in an oven at 130° C. for 200 hours, and the resistance to hydrolysis in terms of percent tensile strength retention after immersion in hot water at 90° C. for 300 hours. The polyurethane composition was also evaluated globally. The symbol O means that it was judged suitable for use as a coating composition for leather-like sheet materials and other articles made of plastics, rubbers, glass, etc, and the symbol X means that the composition was unsuited for such use.

The raw materials used in the examples for producing polyurethanes were expressed in terms of abbreviations listed in the table given below. Some solvents were also expressed in terms of abbreviations as defined below in the table.

| Abbreviation | Compound |
| --- | --- |
| PCL | Polycaprolactone diol |
| PC | 1,6-Hexanediol polycarbonate |
| PTG | Polytetramethylene ether glycol |
| PEG | Polyethylene ether glycol |
| H$_{12}$MDI | Dicyclohexylmethane-4,4'-diisocyanate |
| IPDI | Isophorone diisocyanate |
| MDI | Diphenylmethanediisocyanate |
| HDI | Hexamethylene diisocyanate |
| H$_{12}$DAM | 4,4'-Diaminodicyclohexylmethane |
| IPDA | Isophoronediamine |
| HH | Hydrazine hydrate |
| IDH | Isophthalic acid dihydrazide |
| ADH | Adipic acid dihydrazide |

-continued

| Abbreviation | Compound |
| --- | --- |
| SDH | Sebacic acid dihydrazide |
| DMF | Dimethylformamide |
| THF | Tetrahydrofuran |
| EC | Ethyl cellosolve |
| MEC | Methyl cellosolve |
| IPOH | Isopropanol |

EXAMPLE 1 AND COMPARATIVE EXAMPLES 1-6

Polyurethane elastomers were produced using the reactants given in Table 1. Thus, the polymeric diol and organic diisocyanate each specified in Table 1 were reacted in the mole ratio shown in Table 1 with stirring under a nitrogen atmosphere at 80°-120° C. for 10 hours. The prepolymer obtained was dissolved in a toluene-isopropanol mixture (weight ratio: 5/5). The chain extender shown in Table 1 was dissolved in toluene and the resulting solution was added to the above prepolymer solution and the reaction was thus allowed to proceed under nitrogen at 30° C. As the reaction proceeded, the viscosity of the reaction mixture increased. When the viscosity of the reaction mixture reached about 100 poises, methanol was added to the reaction system so that the toluene/isopropanol/methanol weight ratio became 6/4/3. The addition of methanol caused rapid decrease in the viscosity of the reaction system. The reaction was continued and the viscosity of the reaction mixture again increased. When the viscosity reached 10 poises, the reaction was discontinued. A 30-microns thick film was prepared by the dry method by casting the polyurethane solution obtained (polyurethane concentration: 15 percent by weight) onto a glass sheet followed by drying. This dry-method film was subjected to various physical characteristics tests. The above polyurethane solution was also applied to the surface of a leather-like sheet material substrate in the manner mentioned above and, after drying, the coated surface was embossed with an embossing roll at 170°. On that occasion, the adhesiveness of the polyurethane resin to the roll surface was examined. The results obtained are shown in Table 2.

TABLE 1

| | Polymeric diol: Average molecular weight (Mole ratio) | Organic diisocyanate (Mole ratio) | Chain extender (Mole ratio) |
| --- | --- | --- | --- |
| Example 1 | PCL:2000 (1.0) | H$_{12}$MDI (4.0) | IPDA (1.5) H$_{12}$DAM (0.75) HH (0.75) |
| Comparative Example 1 | PCL:2000 (1.0) | IPDI (4.0) | H$_{12}$DAM (3.0) |
| Comparative Example 2 | PCL:2000 (1.0) | H$_{12}$MDI (4.0) | H$_{12}$DAM (3.0) |
| Comparative Example 3 | PCL:2000 (1.0) | H$_{12}$MDI (4.0) | IPDA (3.0) |
| Comparative Example 4 | PCL:2000 (1.0) | H$_{12}$MDI (4.0) | IPDA (2.0) HH (1.0) |
| Comparative Example 5 | PCL:2000 (1.0) | IPDI (4.0) | H$_{12}$DAM (2.0) HH (1.0) |
| Comparative Example 6 | PCL:2000 (1.0) | H$_{12}$MDI (4.0) | IPDA (0.75) H$_{12}$DAM (1.5) HH (0.75) |

TABLE 2

| | Adhesion to embossing roll | Light stability (%) | Solution stability 30° C. | Solution stability 0° C. | Global evaluation |
|---|---|---|---|---|---|
| Example 1 | O | 86 | O | O | O |
| Comparative Example 1 | X | 0 | O | O | X |
| Comparative Example 2 | — | — | Gelation during polymerization | | XX |
| Comparative Example 3 | X | 0 | O | O | X |
| Comparative Example 4 | X | 90 | O | O | X |
| Comparative Example 5 | X | 86 | O | O | X |
| Comparative Example 6 | O | 83 | X | XX | X |

EXAMPLE 2 AND COMPARATIVE EXAMPLES 7 AND 8

Using the reactants shown in Table 3 and proceeding in the same manner as Example 1, polyurethane compositions were produced. The evaluation results obtained are shown in Table 4.

TABLE 3

| | Polymeric diol: Average molecular weight (Mole ratio) | Organic diisocyanate (Mole ratio) | Chain extender (Mole ratio) | | |
|---|---|---|---|---|---|
| Example 2 | PCL:2000 (1.0) | $H_{12}MDI$ (3.5) | IPDA (1.0) | $H_{12}DAM$ (0.8) | HH (0.7) |
| Comparative Example 7 | PCL:2000 (1.0) | $H_{12}MDI$ (2.4) | IPDA (0.5) | $H_{12}DAM$ (0.5) | HH (0.4) |
| Comparative Example 8 | PCL:2000 (1.0) | $H_{12}MDI$ (5.5) | IPDA (2.0) | $H_{12}DAM$ (1.3) | HH (1.2) |

TABLE 4

| | Adhesion to embossing roll | Light stability (%) | Solution stability 30° C. | Solution stability 0° C. | Global evaluation |
|---|---|---|---|---|---|
| Example 2 | O | 83 | O | O | O |
| Comparative Example 7 | X | 76 | O | O | X |
| Comparative Example 8 | O | 85 | X | XX | X |

EXAMPLES 3 & 4 AND COMPARATIVE EXAMPLES 9–12

Using the reactants shown in Table 5 and proceeding in the same manner as Example 1, polyurethane compositions were produced. The solvents used were as shown in Table 5. The evaluation results are shown in Table 6.

TABLE 5

| | Polymeric diol: Average molecular weight (Mole ratio) | Organic diisocyanate (Mole ratio) | Chain extender (Mole ratio) | Solvent (Weight ratio) |
|---|---|---|---|---|
| Example 3 | PC:2000 (1.0) | $H_{12}MDI$ (3.5) | IPDA (1.0) $H_{12}DAM$ (0.8) HH (0.7) | Toluene (6) Isopropanol (4) Methanol (3) |
| Example 4 | PC:2000 (1.0) | $H_{12}MDI$ (3.5) | IPDA (1.0) $H_{12}DAM$ (0.8) HH (0.7) | DMF (6) Toluene (2.5) Methanol (1.5) |
| Comparative Example 9 | PC:2000 (1.0) | $H_{12}MDI$ (3.5) | IPDA (1.0) $H_{12}DAM$ (0.8) HH (0.7) | Toluene (6) Isopropanol (4) |
| Comparative Example 10 | PC:2000 (1.0) | $H_{12}MDI$ (3.5) | IPDA (1.0) $H_{12}DAM$ (0.8) HH (0.7) | Toluene (4) Isopropanol (6) |
| Comparative Example 11 | PC:2000 (1.0) | $H_{12}MDI$ (3.5) | IPDA (1.0) $H_{12}DAM$ (0.8) HH (0.7) | THF (5) Isopropanol (5) |
| Comparative Example 12 | PC:2000 (1.0) | $H_{12}MDI$ (3.5) | IPDA (1.0) $H_{12}DAM$ (0.8) HH (0.7) | DMF |

TABLE 6

| | Adhesion to embossing roll | Light stability (%) | Solution stability 30° C. | Solution stability 0° C. | Global evaluation |
|---|---|---|---|---|---|
| Example 3 | O | 86 | O | O | O |
| Example 4 | O | 82 | O | O | O |
| Comparative Example 9 | X | 81 | XX | XX | X |
| Comparative Example 10 | X | 80 | XX | XX | X |
| Comparative Example 11 | X | 78 | XX | XX | X |
| Comparative Example 12 | O | 76 | XX | XX | X |

EXAMPLES 5 & 6 AND COMPARATIVE EXAMPLE 13–15

Polyurethane solutions were prepared using the reactants shown in Table 7. Thus, the polymeric diol and organic diisocyanate each specifically given in Table 7 were reacted in the mole ratio shown in Table 7 under nitrogen at 90°–120° C. for 3–10 hours. The prepolymer obtained was dissolved in DMF. A toluene solution of the prescribed amount of the chain extender was then added to the above prepolymer solution and the reaction was allowed to proceed under nitrogen at 30° C. When the viscosity of the reaction mixture reached about 100 poises, methanol was added to the reaction mixture in an amount sufficient to make the DMF/toluene/methanol weight ratio 65/25/10. The addition of methanol caused sharp decrease in the viscosity of the reaction mixture. The reaction was continued and the viscosity of the reaction mixture again increased and reached 10 poises, when the reaction was discontinued. The 15% polyurethane solution thus obtained was submitted to various tests. The results obtained are shown in Table 8.

were used, there were produced polyurethane solutions. The polyurethane solutions were submitted to various tests. The results obtained are shown in Table 10.

TABLE 9

| | Polymeric diol: Average molecular weight (Mole ratio) | Organic diisocyanate (Mole ratio) | Chain extender (Mole ratio) | | Solvent (Weight ratio) |
|---|---|---|---|---|---|
| Example 7 | PC:2000 (1.0) | $H_{12}MDI$ (4.0) | IPDA (1.5) | IDH (1.5) | DMF/toluene/methanol (65) (25) (10) |
| Example 8 | PC:2000 (1.0) | $H_{12}MDI$ (4.0) | IPDA (1.5) | IDH (1.5) | DMF/EC (75) (25) |
| Comparative Example 16 | PC:2000 (1.0) | $H_{12}MDI$ (4.0) | IPDA (1.5) | IDH (1.5) | DMF/EC (35) (65) |
| Comparative Example 17 | PC:2000 (1.0) | $H_{12}MDI$ (4.0) | IPDA (1.5) | IDH (1.5) | DMF/IPOH/toluene (35) (30) (35) |
| Comparative Example 18 | PC:2000 (1.0) | $H_{12}MDI$ (4.0) | IPDA (1.5) | IDH (1.5) | DMF/toluene/methanol (35) (40) (25) |
| Comparative Example 19 | PC:2000 (1.0) | $H_{12}MDI$ (4.0) | IPDA (1.5) | IDH (1.5) | DMF |

TABLE 7

| | Polymeric diol: Average molecular weight (Mole ratio) | Organic diisocyanate (Mole ratio) | Chain extender (Mole ratio) | |
|---|---|---|---|---|
| Example 5 | PCL:2000 (1.0) | $H_{12}MDI$ (4.0) | IPDA (1.5) | IDH (1.5) |
| Example 6 | PCL:2000 (1.0) | $H_{12}MDI$ (4.0) | IPDA (2.0) | IDH (1.0) |
| Comparative Example 13 | PCL:2000 (1.0) | $H_{12}MDI$ (4.0) | IPDA (2.72) | IDH (0.28) |
| Comparative Example 14 | PCL:2000 (1.0) | $H_{12}MDI$ (4.0) | IDH (3.0) | |
| Comparative Example 15 | PCL:2000 (1.0) | $H_{12}MDI$ (4.0) | IDH (1.5) | $H_{12}DAM$ (1.5) |

TABLE 10

| | Adhesion to embossing roll | Light stability (%) | Solution stability 30° 0° C. | | Global evaluation |
|---|---|---|---|---|---|
| Example 7 | O | 90 | O | O | O |
| Example 8 | O | 85 | O | O | O |
| Comparative Example 16 | O | 78 | X | XX | X |
| Comparative Example 17 | O | 76 | X | XX | X |
| Comparative Example 18 | O | 82 | X | XX | X |
| Comparative Example 19 | O | 83 | X | XX | X |

EXAMPLES 9-11 AND COMPARATIVE EXAMPLES 20-22

TABLE 8

| | Adhesion to embossing roll | Light stability (%) | Solution stability 30° C. 0° C. | | Thermal stability (%) | Resistance to hydroylsis (%) | Global evaluation |
|---|---|---|---|---|---|---|---|
| Example 5 | O | 81 | O | O | 80 | 58 | O |
| Example 6 | O | 75 | O | O | 93 | 65 | O |
| Comparative Example 13 | X | 5 | O | O | 98 | 73 | X |
| Comparative Example 14 | O | 82 | O | O | 30 | 23 | X |
| Comparative Example 15 | O | 80 | X | XX | 76 | 56 | X |

EXAMPLES 7 & 8 AND COMPARATIVE EXAMPLES 16-19

Proceeding in the same manner as Example 5 except that the polymeric diol and solvents shown in Table 9

Polyurethane solutions were prepared in the same manner as Example 1 using the reactants shown in Table 11. The evaluation results obtained are shown in Table 12.

TABLE 11

| | Polymeric diol: Average molecular weight (Mole ratio) | Organic diisocyanate (Mole ratio) | Chain extender (Mole ratio) | Solvent (Weight ratio) |
|---|---|---|---|---|
| Example 9 | PCL:2000 (0.7) PEG:2000 (0.3) | $H_{12}MDI$ (4.0) | IPDA (1.4) $H_{12}DAM$ (0.8) HH (0.8) | Toluene/IPOH/methanol (45) (32) (23) |
| Example 10 | PCL:2000 (0.7) PEG:2000 (0.3) | $H_{12}MDI$ (4.0) | IPDA (2.0) IDH (1.0) | DMF/toluene/MEC (60) (20) (20) |
| Example 11 | PC:2000 (0.6) PEG:1000 (0.4) | $H_{12}MDI$ (3.6) | IPDA (1.0) $H_{12}DAM$ (1.1) HH (0.5) | DMF/toluene/EC (50) (30) (20) |

TABLE 11-continued

|  | Polymeric diol: Average molecular weight (Mole ratio) | Organic diisocyanate (Mole ratio) | Chain extender (Mole ratio) | Solvent (Weight ratio) |
|---|---|---|---|---|
| Comparative Example 20 | PC:2000 (0.7) PEG:2000 (0.3) | $H_{12}$MDI (4.0) | IPDA (3.0) | Toluene/IPOH/methanol (45) (32) (23) |
| Comparative Example 21 | PCL:2000 (0.7) PEG:2000 (0.3) | $H_{12}$MDI (0.7) IPDI (3.3) | $H_{12}$DAM (2.5) HH (0.5) | Toluene/IPOH/methanol (43) (32) (23) |
| Comparative Example 22 | PCL:2000 (0.7) PEG:2000 (0.3) | $H_{12}$MDI (2.4) | IDH (0.7) IPDA (0.7) | DMF |

TABLE 12

|  | Adhesion to embossing roll | Light stability (%) | Solution stability 30° C. | Solution stability 0° C. | Global evaluation |
|---|---|---|---|---|---|
| Example 9 | O | 53 | O | O | O |
| Example 10 | O | 48 | O | O | O |
| Example 11 | O | 50 | O | O | O |
| Comparative Example 20 | X | 0 | O | O | X |
| Comparative Example 21 | X | 48 | O | O | X |
| Comparative Example 22 | X | 45 | O | O | X |

EXAMPLES 12-14 AND COMPARATIVE EXAMPLES 23-26

Polyurethane solutions were prepared using the reagents and solvents mentioned in Table 13 in the same manner as Example 1 and tested. The results are shown in Table 14. The bending test referred to in Table 14 was conducted in the following manner. Each polyurethane solution is sheeted out on a glass plate and dried. The resulting film with a thickness of 0.35 mm is cut into a test strip 8 mm wide and 10 cm long, which is subjected to a bonding load of 1.5 kg at 20° C. in accordance with MIT Bending Test. In the table, Tg stands for glass transition temperature.

TABLE 13

|  | Polymeric diol: Average molecular weight (Mole ratio) | Organic diisocyanate (Mole ratio) | Chain extender (Mole ratio) | Solvent (Weight ratio) |
|---|---|---|---|---|
| Example 12 | PCL:2000 (1.0) | $H_{12}$MDI (3.6) | IPDA (1.0) $H_{12}$DAM (1.1) HH (0.5) | Toluene/IPOH/methanol (45) (35) (20) |
| Example 13 | PTG:1500 (1.0) | $H_{12}$MDI (3.6) | IPDA (2.0) IDH (0.6) | DMF/THF/methanol (60) (25) (15) |
| Example 14 | PCL:2000 (0.7) PEG:2000 (0.3) | $H_{12}$MDI (3.6) | IPDA (1.0) IDH (1.6) | DMF/toluene/MEC (55) (25) (20) |
| Comparative Example 23 | PCL:1000 (1.0) | $H_{12}$MDI (3.6) | IPDA (1.0) $H_{12}$DAM (1.1) HH (0.5) | THF/IPOH/EC (45) (25) (30) |
| Comparative Example 24 | PC:1000 (1.0) | $H_{12}$MDI (2.5) | IPDA (0.7) $H_{12}$DAM (0.5) HH (0.3) | DMF |
| Comparative Example 25 | PCL:1000 (0.7) PEG:1000 (0.3) | $H_{12}$MDI (2.5) | IPDA (0.7) IDH (0.8) | DMF |
| Comparative Example 26 | PCL:900 (0.5) PC:1200 (0.5) | $H_{12}$MDI (2.5) | IPDA (0.8) IDH (0.7) | DMF/toluene/methanol (60) (30) (10) |

TABLE 14

|  | Adhesion to embossing roll | Solution stability 30° C. | Solution stability 0° C. | Bending test | Tg (°C.) | Global evaluation |
|---|---|---|---|---|---|---|
| Example 12 | O | O | O | No breakage after 2 million times of bending | −38 | O |
| Example 13 | O | O | O | No breakage after 2 million times of bending | −40 | O |
| Example 14 | O | O | O | No breakage after 2 million times of bending | −32 | O |
| Comparative Example 23 | O | X | XX | Breakage after 2 million times of bending | 0 ~ −5 | X |
| Comparative Example 24 | X ~ Δ | O | X | Breakage after 10 thousand times of bending | −10 | X |
| Comparative Example 25 | X ~ Δ | O | X | Breakage after 1 million times bending | −6 | X |
| Comparative Example 26 | X ~ Δ | O | O | Breakage after 300 thousand times of | −5 | X |

EXAMPLE 15-21 AND COMPARATIVE EXAMPLES 27-32

Polyurethane solutions were prepared in the same manner as Example 1, using 1 mole of PCL (average molecular weight: 2,000) as the polymeric diol, a mixture of 3.0 moles of $H_{12}MDI$ and 1.0 mole of IPDI as the organic diisocyanate, a mixture of 1.1 moles of IPDA, 1.3 moles of $H_{12}DAM$ and 0.6 mole of HH as the chain extender, and each of various solvents or solvent systems as shown below in Table 15 as the solvent. The stability evaluation results for the polyurethane solutions obtained are shown in Table 15.

TABLE 15

| | Solvent (weight ratio) | Solution stability 30° C. | 0° C. |
|---|---|---|---|
| Example 15 | Toluene/IPOH/methanol (45/32/23) | O | O |
| Example 16 | Toluene/IPOH/EC (50/20/30) | O | O |
| Example 17 | THF/IPOH/ethanol/water (45/35/15/5) | O | O |
| Example 18 | Cyclohexanone/MEC (65/35) | O | O |
| Example 19 | Cyclohexanone/EC (50/50) | O | O |
| Example 20 | Toluene/IPOH/n-propanol (45/26/39) | O | O |
| Example 21 | DMF/toluene/methanol (60/25/15) | O | O |
| Comparative Example 27 | Toluene/IPOH (50/50) | XX | XX |
| Comparative Example 28 | THF/IPOH (60/40) | XX | XX |
| Comparative Example 29 | Cyclohexanone/IPOH (50/50) | XX | XX |
| Comparative Example 30 | DMF | XX | XX |
| Comparative Example 31 | Dimethylacetamide | XX | XX |
| Comparative Example 32 | Dimethyl sulfoxide | XX | XX |

EXAMPLES 22-25 AND COMPARATIVE EXAMPLE 33-36

Polyurethane solutions were prepared in the same manner as Example 5 using the reactants and solvents as shown in Table 16. The stability evaluation results for the polyurethane solutions obtained are shown in the same table.

TABLE 16

| | Polymeric diol: Average molecular weight (Mole ratio) | Organic diisocyanate (Mole ratio) | Chain extender (Mole ratio) | Solvent (weight ratio) | Solution stability 30° C. | 0° C. |
|---|---|---|---|---|---|---|
| Example 22 | PC:2000 (0.8) PEG:2000 (0.2) | $H_{12}MDI$ (4.0) | IDH (1.2) IPDA (1.8) | DMF/toluene/methanol (60) (25) (15) | O | O |
| Example 23 | PC:2000 (0.8) PEG:2000 (0.2) | $H_{12}MDI$ (4.0) | IDH (1.8) IPDA (1.2) | DMF/cyclohexanone/EC (60) (20) (20) | O | O |
| Example 24 | PC:2000 (0.8) PEG:2000 (0.2) | $H_{12}MDI$ (4.0) | IDH (1.5) IPDA (1.5) | DMF/THF/MEC (60) (20) (20) | O | O |
| Example 25 | PC:2000 (0.8) PEG:2000 (0.2) | $H_{12}MDI$ (4.0) | IDH (1.5) IPDA (1.5) | DMF/THF/water (70) (20) (10) | O | O |
| Comparative Example 33 | PC:2000 (0.8) PEG:2000 (0.2) | $H_{12}MDI$ (4.0) | IDH (1.2) IPDA (1.8) | Toluene/IPOH (60) (40) | XX | XX |
| Comparative Example 34 | PC:2000 (0.8) PEG:2000 (0.2) | $H_{12}MDI$ (4.0) | IDH (1.8) IPDA (1.2) | Toluene/IPOH/methanol (45) (32) (23) | XX | XX |
| Comparative Example 35 | PC:2000 (0.8) PEG:2000 (0.2) | $H_{12}MDI$ (4.0) | IDH (1.5) IPDA (1.5) | DMF | X | XX |
| Comparative Example 36 | PC:2000 (0.8) PEG:2000 (0.2) | $H_{12}MDI$ (4.0) | IDH (1.5) IPDA (1.5) | DMF/cyclohexanone/EC (35) (35) (30) | X | XX |

EXAMPLES 26-28 AND COMPARATIVE EXAMPLE 37-41

Polyurethane solutions were prepared in the same manner as Example 1 using the reactants and solvents shown in Table 17. The polyurethane solutions obtained were subjected to various tests. The results obtained are shown in Table 18.

TABLE 17

| | Polymeric diol: Average molecular weight (Mole ratio) | Organic diisocyanate (Mole ratio) | Chain extender (Mole ratio) | Solvent (Weight ratio) |
|---|---|---|---|---|
| Example 26 | PCL:2000 (1.0) | $H_{12}MDI$ (4.0) | IPDA (1.4) $H_{12}DAM$ (1.0) HH (0.6) | Toluene/IPOH/methanol (45) (32) (23) |
| Example 27 | PCL:2000 (0.7) PEG:2000 (0.3) | $H_{12}MDI$ (4.0) | IPDA (1.2) $H_{12}DAM$ (1.0) HH (0.8) | Toluene/IPOH/methanol (45) (32) (23) |
| Example 28 | PC:2000 (1.0) | $H_{12}MDI$ (4.0) | IDH (1.5) IPDA (1.5) | DMF/toluene/MEC (60) (20) (20) |

TABLE 17-continued

| | Polymeric diol: Average molecular weight (Mole ratio) | Organic diisocyanate (Mole ratio) | Chain extender (Mole ratio) | Solvent (Weight ratio) |
|---|---|---|---|---|
| Comparative Example 37 | PCL:2000 (1.0) | HDI (4.0) | IPDA (1.0) H$_{12}$DAM (1.0) HH (1.0) | Toluene/IPOH/methanol (45) (32) (23) |
| Comparative Example 38 | PCL:2000 (1.0) | HDI (4.0) | H$_{12}$DAM (2.0) HH (1.0) | Toluene/IPOH/methanol (45) (32) (23) |
| Comparative Example 39 | PCL:2000 (1.0) | H$_{12}$MDI (2.0) HDI (2.0) | IPDA (1.0) H$_{12}$DAM (1.0) HH (1.0) | Toluene/IPOH/methanol (45) (32) (23) |
| Comparative Example 40 | PCL:2000 (1.0) | H$_{12}$MDI (2.0) HDI (2.0) | H$_{12}$DAM (2.0) HH (1.0) | Toluene/IPOH/methanol (45) (32) (23) |
| Comparative Example 41 | PCL:2000 (1.0) | MDI (4.0) | IPDA (2.0) HH (1.0) | DMF |
| Comparative Example 42 | PCL:2000 (1.0) | H$_{12}$MDI (4.0) | IPDA (1.5) ADH (1.5) | DMF/toluene/MEC (60) (20) (20) |
| Comparative Example 43 | PCL:2000 (1.0) | H$_{12}$MDI (4.0) | IPDA (1.5) SDH (1.5) | DMF/toluene/MEC (60) (20) (20) |

TABLE 18

| | Adhesion to embossing roll | Light stability (%) | Solution stability 30° C. | Solution stability 0° C. | Global evaluation |
|---|---|---|---|---|---|
| Example 26 | O | 85 | O | O | O |
| Example 27 | O | 68 | O | O | O |
| Example 28 | O | 82 | O | O | O |
| Comparative Example 37 | XX | 70 | Δ | X | X |
| Comparative Example 38 | XX | 70 | Δ | X | X |
| Comparative Example 39 | X | 78 | O | X | X |
| Comparative Example 40 | — | — | Gelation during polymerization | | X |
| Comparative Example 41 | O | O | X | XX | X |
| Comparative Example 42 | X | 79 | O | X | X |
| Comparative Example 43 | X | 78 | O | X | X |

What is claimed is:

1. A polyurethane composition which comprises a polyurethane synthesized substantially from (a) a polymeric diol having an average molecular weight within the range of 1,200 to 2,500, (b) an alicyclic organic diisocyanate, (c) an alicyclic organic diamine and (d) hydrazine or isophthalic acid dihydrazide and a mixed solvent capable of dissolving said polyurethane, said polyurethane satisfying the following conditions (i) through (iv), namely (i) that component (b) comprises at least 20 mole percent thereof of an alicyclic organic diisocyanate having the formula

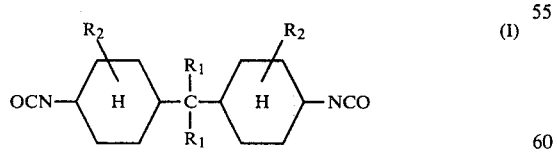

wherein $R_1$ and $R_2$ each is a hydrogen atom or a lower alkyl group, (ii) that the mole ratio of component (b) to component (a) is within the range of 2.5 to 5.0, (iii) that at least one of components (b) and (c) comprises as a component thereof a compound having the formula

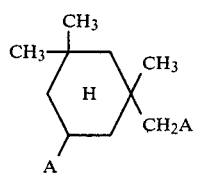

wherein A is an amino or isocyanato group and that the total content of the compound or compounds of the above formula (II) based on the sum total of components (b), (c) and (d) is 15 to 45 mole percent, and (iv) that, when component (d) is hydrazine, component (c) comprises at least 20 mole percent thereof of an alicyclic organic diamine having the formula

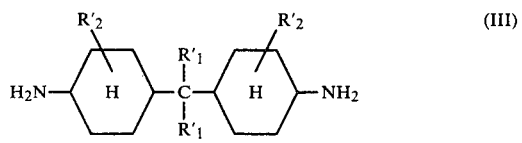

wherein
$R_1'$ and $R_2'$ each is a hydrogen atom or a lower alkyl group and that the mole ratio of component (d) to the sum total of components (c) and (d) is within the range of 0.05 to 0.5, or
that, when component (d) is isophthalic acid dihydrazide, the mole ratio of component (d) to the sum total of components (c) and (d) is within the range of 0.1 to 0.7, and
said mixed solvent satisfying the condition (v) that it comprises 3 to 70 percent by weight thereof of a compound of the general formula $$R(CH_2)_nOH \qquad (IV)$$

wherein R is a hydrogen atom or a methoxy, ethoxy or acetoxy group and, when R is a hydrogen atom, n is an integer of 0 through 4 and when R is a methoxy, ethoxy or acetoxy group, n is 2, and that, when component (d) is isophthalic acid dihydrazide, said mixed solvent comprises 40 to 97 percent by weight thereof of an aprotic polar compound.

2. A polyurethane composition according to claim 1, wherein said polymeric diol is a diol containing ethylene oxide structural units or a diol mixture composed of an ethylene oxide structural unit-containing diol and an ethylene oxide structural unit-free diol, the content of the ethylene oxide structural units in said polymeric diol being 5 to 50 percent by weight.

3. A polyurethane composition according to claim 2, wherein said diol mixture is a diol mixture composed of a polyester glycol and a polyethylene ether glycol or a diol mixture composed of a polycarbonate glycol and a polyethylene ether glycol.

4. A polyurethane composition according to claim 1, wherein the alicyclic organic diisocyanate represented by formula (I) is dicyclohexylmethane-4,4'-diisocyanate.

5. A polyurethane composition according to claim 1, wherein the alicyclic organic diamine represented by formula (III) is 4,4'-diaminodicyclohexylmethane.

6. A polyurethane composition according to claim 1, wherein the proportion of the polyurethane to the sum total of the polyurethane and the mixed solvent is within the range of 3 to 40 percent by weight.

7. A polyurethane composition according to claim 1, wherein said aprotic polar compound is selected from the group consisting of dimethylformamide, dimethylacetamide, dimethyl sulfoxide and N-methylpyrrolidone.

* * * * *